UNITED STATES PATENT OFFICE.

ALFRED L. PELLEGRIN, OF TUCSON, ARIZONA.

PROCESS OF TREATING ORES.

1,286,400.             Specification of Letters Patent.       Patented Dec. 3, 1918.

No Drawing.        Application filed January 2, 1917.   Serial No. 140,128.

*To all whom it may concern:*

Be it known that I, ALFRED L. PELLEGRIN, a citizen of the United States, residing at Tucson, in the county of Pima and State of Arizona, have invented a certain new and useful Improvement in Processes of Treating Ores, of which the following is a full, clear, and exact description.

This invention relates to processes of treating ores; and it comprises a method of recovering the values from certain ores containing uranium, vanadium, molybdenum and other rare metals wherein such ores are reduced to a pulp or material of extreme fineness and this material (advantageously after moistening) is treated with concentrated sulfuric acid and the mixture allowed to react under its own heat, which is advantageously supplemented by extraneous heat, the soluble and insoluble matters formed in the reaction being thereafter separately recovered; all as more fully hereinafter set forth and as claimed.

In the treatment of ores containing uranium, vanadium and various other rare metals, many different processes have been proposed and used. In so far as they are wet methods, however, they are mostly the ordinary laboratory procedures on a larger scale. It is a common expedient, for example, to boil the ores or concentrates, obtained in various ways, with dilute acid to extract the values; to bring them in solution. In practice, however, this is tedious and unsatisfactory, requiring a number of extractions. Particular types of apparatus adapted for boiling acid liquids are also necessary. The reason for this difficulty with ores containing rare metals like uranium and vanadium is that their oxids are of a more or less acid nature and therefore are not particularly soluble in dilute acids. Vanadic anhydrid, usually called vanadic acid, ($V_2O_5$), for example, is very little soluble in acid until it is reduced to a lower oxid. Taking the ordinary ore concentrates as they are usually obtained on shaking tables and like apparatus, they may be said to be of comparatively coarse grain size, rarely being finer than 20–40 mesh. This coarseness, together with the difficult solubility of acid oxids in dilute acids, causes repeated extractions to be necessary to obtain even a moderate recovery of the values.

I have found that if I modify this procedure by using strong acids, in lieu of boiling with comparatively weak acids, I can secure better recovery with a less number of extractions, or even with one extraction. The best acid for my purpose is concentrated sulfuric acid. Concentrated sulfuric acid, unlike the dilute acid, combines readily with these acid oxids; and I have found that if I grind the concentrates to extreme fineness, as by using a tube or ball mill, and then mix the material, after moistening with hot water or hot dilute sulfuric acid, with strong sulfuric acid, spontaneous reaction sets in with practically complete action upon the contained values. The fineness of the material for securing this complete action should ordinarily be very great, so that nearly all the material will pass a 150 or 200 mesh sieve. The action of concentrated sulfuric acid on these ores, after moistening with hot water, develops considerable heat; and this spontaneous heat may be all that is necessary for the present purposes. But it may be reinforced by external heating if desired. The material being nearly solid, heating is convenient with simpler and cheaper apparatus than that required for boiling dilute liquids. The development of heat in the material may be reinforced without detriment to the action of the sulfuric acid by using a limited amount of moisture with the fine ore; a procedure which is otherwise advantageous since the moistened dust is easier to mix with the acid than it is when dry. But the amount of moisture present should not be such as to dilute the acid unduly, and instead of water for furnishing this moistening liquid I may with advantage use more dilute acid liquids from a later stage in the procedure.

The present invention is particularly adapted for use with wulfenite (lead molybdate) and vanadinite (lead vanadate) although it may be used with many other ores containing vanadium, uranium and molybdenum in an oxidized state. By treating wulfenite or vanadinite, containing a limited amount of hot water, with concentrated sulfuric acid, the lead is converted into lead sulfate (which may be subsequently recovered) and the liberated acids combined with the strong sulfuric acid. Great heat is generated in this operation where strong sulfuric acid is used.

In an embodiment of the present invention I may first grind wulfenite concentrates, which are advantageously as pure as may be, until practically all of the material will pass a sieve of 150 or 200 mesh. The impalpable powder thus obtained is moistened with hot water, or hot dilute sulfuric acid, enough being used to get the air out. The mud or paste is then mixed with concentrated sulfuric acid, this being advantageously done in a closed lead-lined iron barrel. The amount of sulfuric acid used may be equal to the amount of ore. After a thorough agitation by revolving the barrel or otherwise the mass is discharged into vats of any suitable material, such as wood lined with lead, where it is allowed to settle. The settled material may be washed by successive acid washes or it may be put through a filter press. The wash liquids should be stored separately according to their strengths. The most concentrated may be used for moistening the ore. In the case of pure wulfenite, the insoluble cake obtained will be substantially pure sulfate of lead which may be briqueted for smelting or may be treated to convert it into oxid, carbonate, etc. The solution obtained after separation of the lead sulfate can be made slightly alkaline with lime or lime carbonate (calcium carbonate), or any other convenient alkaline material, and heated. I may then pass in hydrogen sulfid gas to precipitate the molybdenum as a sulfid. This sulfid may be removed by filter-pressing, decantation or ordinary filtration. This sulfid is of high purity and commands a high market price. Saturation with hydrogen sulfid is best done in a closed vessel under pressure, either that of the gas or that of steam, as this materially aids in complete precipitation and good utilization of the hydrogen sulfid. The solution may still contain vanadium. This may now be precipitated in any one of a variety of ways. By adding iron oxid or iron sulfate iron vanadate may be precipitated. Lead vanadate may be treated in exactly the same way if it contains any molybdenum. If it does not, the precipitation with hydrogen sulfid may be omitted. Sodium sulfid and other sulfids may be used in lieu of hydrogen sulfid but are not as advantageous and are not as convenient. Wulfenite and vanadinite are recognized as unusually "rebellious" ores but the present process extracts the values from them with substantial completeness. More tractable ores, such as those containing uranium and many other rare metals, may be treated in the same way with even greater ease. The characteristic feature of the present method is the reduction of the ore containing oxidized rare metals of a more or less acid nature to a condition of extreme fineness and then allowing it to enter into a spontaneous or substantially spontaneous reaction with strong sulfuric acid and hot water. Outside heat may be used and is often useful; but the self-generated heat is an important factor in the operation. This is one of the reasons why I find it much more advantageous to work on high grade materials;—the materials which have been freed as far as possible from silica and other bodies inert to sulfuric acid.

With vanadinite and wulfenite a mixture of one-third ore, one-third water and one-third strong sulfuric acid is thin enough to flow and such a mixture is convenient in handling for this reason. But I regard it as better to use instead of water a somewhat diluted sulfuric acid from a later stage. This increases the amount of sulfuric acid over the amount necessary, chemically, for the treatment of the ore, but this excess can be later recovered. If the acid used with the ore is too weak, a second treatment may be necessary. If the right amount of acid in the right concentration is used upon the ore to obtain complete attack, the lead sulfate separated may be merely washed with plain water and the washings added to the sulfuric acid solution removed from the cake of lead sulfate.

For obvious reasons, I ordinarily employ dry concentrates. Where the concentrates come from a wet method of separation, or where the ore has been crushed wet, it will be necessary to remove the excess of water prior to submitting the material to the present process. This may be done by any of the ordinary "thickening" devices in use in metallurgical work, as for instance those employed in various cyanid processes.

Strong commercial sulfuric acid of 65° Bé. may be employed with dry ore; but I find it better to use it somewhat diluted or to use more or less water with the ore fines. Acid which is too strong when in contact with the ore is, like dilute acid, less solvent on these more or less acid oxids than an acid of intermediate strength—an acid which is concentrated but not too concentrated; and an important part is played by the heat generated by the reaction of the strong acid with the hot water or dilute acid.

Instead of first treating the dry pulp with hot water or hot dilute sulfuric acid, I may first add the strong sulfuric acid to the dry pulp and the hot water or hot dilute sulfuric acid may then be added.

Having thus described my invention, what I claim is:—

1. In the treatment of rebellious ores containing acid oxids of rare metals, such as vanadium, uranium, molybdenum, etc., the process which comprises reducing such ore to a fineness of 150 mesh or more, mixing with strong sulfuric acid under such conditions as to cause a development of heat but without reduction of the acid oxid, and separating the acid solution thus formed from the residual undissolved solid matter.

2. In the treatment of wulfenite, the process which comprises reducing the wulfenite to a fineness of 150 mesh or higher, mixing with strong sulfuric acid under such conditions as to cause a development of heat but without reduction of the acid oxid, and separating the acid solution thus formed from the residual undissolved solid matter.

3. In the treatment of ores containing molybdenum in an oxidized form, the process which comprises reducing the molybdenum ore to a fineness of 150 mesh or more, mixing with strong sulfuric acid under such conditions as to cause a development of heat but without reduction of the acid oxid, and separating the acid solution thus formed from the residual undissolved solid matter.

4. In the treatment of ores containing molybdenum in an oxidized form, the process which comprises reducing the molybdenum ore to a fineness of 150 mesh or more, mixing with a strong sulfuric acid, removing the acid solution formed, neutralizing and precipitating with a sulfid to form molybdenum sulfid.

5. In the treatment of rebellious ores containing acid oxids of rare metals, such as vanadium, uranium, molybdenum, etc., the process which comprises reducing such ore to a fineness of 150 mesh or more, mixing with a small amount of a strong sulfuric acid and hot water or hot dilute sulfuric acid and separating the acid solution thus formed from the residual undissolved solid matters.

6. In the treatment of wulfenite, the process which comprises reducing the wulfenite to a fineness of 150 mesh or higher, mixing with a strong sulfuric acid and hot water or hot dilute sulfuric acid and separating the acid solution thus formed from the residual undissolved solid matters.

7. In the treatment of ores containing molybdenum in an oxidized form, the process which comprises reducing the molybdenum ore to a fineness of 150 mesh or more, mixing with a strong sulfuric acid and hot water or hot dilute sulfuric acid and separating the acid solution thus formed from the residual undissolved solid matters.

8. In the treatment of ores containing molybdenum in an oxidized form, the process which comprises reducing the molybdenum ore to a fineness of 150 mesh or more, mixing with a strong sulfuric acid and hot water or hot dilute sulfuric acid, removing the acid solution formed, neutralizing and precipitating with a sulfid to form molybdenum sulfid.

9. In the treatment of ores containing acid oxids of rare metals, such as vanadium, uranium, molybdenum, etc., the process which comprises reducing such ore to a fineness of 150 mesh or more, mixing with strong sulfuric acid under such conditions as to cause a development of heat but without reduction of the acid oxid, and separating the acid solution thus formed from the residual undissolved solid matter.

10. In the treatment of rebellious ores containing acid oxids of rare metals, such as vanadium, uranium, molybdenum, etc., the process which comprises comminuting such an ore to a fineness of 150 mesh or more, mixing with strong sulfuric acid under such conditions as to cause a development of heat but without reduction of the acid oxid, hot water or hot dilute sulfuric acid being employed to facilitate mixing, and separating the acid solution thus formed from the residual undissolved solid matters.

In testimony whereof, I hereunto affix my signature in the presence of two witnesses.

ALFRED L. PELLEGRIN.

Witnesses:
 ELBERTA MOSES,
 ISABEL M. LAUDER.